United States Patent [19]

Kromolicki et al.

[11] 4,206,103
[45] Jun. 3, 1980

[54] VINYL CHLORIDE POLYMERS HAVING IMPROVED STABILITY

[75] Inventors: Zigmunt K. Kromolicki, Lisse; Ved K. Sahajpal, BR Oudorp; Cornelis Van Gelder, Beemster, all of Netherlands

[73] Assignee: Borg-Warner Corporation, Chicago, Ill.

[21] Appl. No.: 909,595

[22] Filed: May 25, 1978

[51] Int. Cl.$^2$ ............................................. C08L 91/00
[52] U.S. Cl. .................................. 260/28.5 D; 252/1; 252/8.1; 252/407; 252/399; 260/23 XA; 260/45.8 R
[58] Field of Search ...................... 260/45.8 R, 28.5 D, 260/23 XA; 252/380, 1, 8.1, 399, 407

[56] References Cited

U.S. PATENT DOCUMENTS

| | | | |
|---|---|---|---|
| 3,205,250 | 9/1965 | Hechenbleikner | 260/45.8 R |
| 3,998,782 | 12/1976 | Hutton et al. | 260/45.8 R |
| 4,064,100 | 12/1977 | Hechenbleikner | 260/45.8 R |

OTHER PUBLICATIONS

"Encyclopedia of PVC," vol. 1, pp. 308–309, Marcel Dekker, Inc., New York (1976).

*Primary Examiner*—Melvyn I. Marquis
*Attorney, Agent, or Firm*—Joseph Shekleton

[57] ABSTRACT

A vinyl chloride polymer composition containing small proportions of a dialkyl pentaerythritol diphosphite and a solid, aliphatic polyhydroxy compound. The composition is characterized by good thermal stability and resistance to coloration on exposure to ultraviolet light.

17 Claims, No Drawings

VINYL CHLORIDE POLYMERS HAVING IMPROVED STABILITY

BACKGROUND OF THE INVENTION

This invention relates to the stabilization of vinyl chloride polymers. More particularly, it relates to such stabilization as results from the action of a combination of additives. Still more particularly, it relates to certain vinyl chloride compositions which are notably stable at high temperatures and which, also, are relatively stable to coloration on exposure to ultraviolet light.

A very difficult problem which faced early processors of vinyl chloride polymers was that of stability. It had been known that these polymers are heat sensitive, light sensitive and subject to the corrosive action of metals, particularly iron. Since it is not possible to process the material at ordinary temperatures, or to use a non-ferrous paint, and since a light-sensitive material is of no use for the fabrication of consumer goods, all of these problems had to be solved if the art was to be developed.

Very large amounts of vinyl chloride polymers are produced today, largely because of their great versatility. This versatility, however, exacerbates the problem of stability. Means must be found of stabilizing such polymers under conditions ranging from the extrusion of inplasticized polymer at 200° C. to the calendering of material containing up to 50% of plasticizer at 190° C., or of stabilizing either type of composition so that it will withstand a molding process with a long cycle. The finished product may have to be crystal clear, or it may be loaded with heavy fillers. It may be processed hot, or applied as a cold, free-flowing paste, and then heated rapidly to a high temperature. There is, thus, a need for a wide variety of stabilizers.

It is known that vinyl chloride polymers undergo chemical degradation and darkening when heated under conditions of molding or extrusion. Many types of chemical stabilizers are effective to inhibit these types of deterioration, including various metal salts of inorganic and organic acids and certain organometallic compounds, especially organotin compounds.

Hechenbleikner (U.S. Pat. No. 3,205,250) suggests the use of dialkyl pentaerythritol diphosphites as stabilizers for polyvinyl chloride.

The "Encyclopedia of PVC," Vol. 1, edited by Nass and published by Marcel Dekker, Inc., New York (1976), pages 308-9, suggests the use of mannitol, sorbitol, etc., as stabilizers for polyvinyl chloride. Phosphites are also suggested for use in polyvinyl chloride.

SUMMARY OF THE INVENTION

The invention of this application is a composition of matter effective in minor proportions to impart color stability to vinyl chloride polymers comprising in combination a dialkyl pentaerythritol diphosphite wherein the alkyl groups each contain 8-20 carbon atoms and a solid, aliphatic polyhydroxy compound.

The vinyl chloride polymer may be a homopolymer of vinyl chloride, or a copolymer thereof with minor proportions of other ethylenically unsaturated compounds copolymerized therewith. In a preferred form of this invention, the vinyl chloride resin is a simple homopolymer of vinyl chloride, since the hardest and most rigid compositions are obtainable with the homopolymers of vinyl chloride; however, the resin may contain up to 20% of other unsaturated compounds copolymerizable with vinyl chloride without detracting from the essential nature of the vinyl chloride resin. Conversely stated, the resins should have at least 80% of vinyl chloride copolymerized therein. Suitable unsaturated compounds include, for instance, vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3-piperylene, divinyl ketone and the like. For a fairly complete list of materials known to polymerize with vinyl chloride, reference may be had to Krczil: "Kurzes Handbuch der Polymerisations-Technik-II Mehrstoff Polymerization" Edward Bros. Inc., 1945, pp. 735-747, the items under "Vinyl chlorid." As a rough rule, the criterion of a practical consumer for use with vinyl chloride, to produce copolymers containing 80% or more of vinyl chloride is that, on a mole percentage basis, an initial charge of 96% vinyl chloride, balance comonomer, shall yield an initial copolymer containing (a) at least 90% vinyl chloride, and (b) not more than 99% vinyl chloride. On this basis, satisfactory comonomers for use with vinyl chloride will be those having "$Q_2$" and "$e_2$" values, as described in J. Polymer Science 2:101, correlated as follows, assuming for vinyl chloride $$Q \text{ vinyl chloride} = .03, \text{ and } e \text{ vinyl chloride} = .3$$

$$4.1 > \frac{\frac{.029e^{-.3(.3-e2)}}{Q_2} + .04}{1.33Q_2 e^{e2(.3-e2)} + .96} > .37$$

Instead of the single unsaturated comonomers of the types above indicated, mixtures of such comonomers may enter into the copolymers, it being understood that the total quantity thereof shall be small enough (i.e. not over 20% based on the weight of the copolymer) that the essential character of the polyvinyl chloride resin chain is retained.

The dialkyl pentaerythritol diphosphites are prepared by the reaction of two mols of an alcohol with diphenyl (or dichloro) pentaerythritol diphosphite. The reaction is illustrated by the equation:

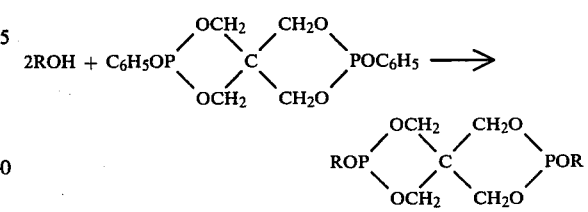

The product shown above is the spiro isomer, and where diphenyl pentaerythritol diphosphite is the reactant, as above, this spiro isomer comprises about half of the combined total of spiro and caged isomers. The caged isomer has the structure:

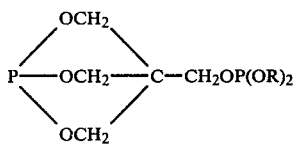

When dichloro pentaerythritol diphosphite is substituted for the diphenyl compound as the reactant, however, the product which results is relatively pure spiro isomer. Inasmuch as the spiro isomer is itself more stable to hydrolysis, it is a preferred form.

The dialkyl pentaerythritol diphosphite preferably is one wherein the alkyl groups each are stearyl groups, and an especially preferred embodiment is the spiro isomer of distearyl pentaerythritol diphosphite. This preference is based, of course, on the inherent, excellent hydrolytic stabiity of this isomer. Another preferred embodiment is a mixture of approximately equal proportions of spiro and caged isomers, a preference based on its ready availability and generally acceptable hydrolytic stability. It is conveniently prepared, as noted above, by the reaction of stearyl alcohol and diphenyl pentaerythritol diphosphite.

Still another preferred embodiment of the invention involves the use of an encapsulated dialkyl pentaerythritol diphosphite. This embodiment affords an even higher degree of hydrolytic stability. The encapsulating material preferably is a wax, e.g., a natural wax such as a petroleum wax or ester wax; an especially preferred wax for this purpose is a glycerol ester of montanic acid.

The amount of dialkyl pentaerythritol diphosphite which is to be used will be within the range of from about 0.1% to about 2.0%.

The solid aliphatic polyhydroxy compound preferably is one containing at least four hydroxy groups. These include pentaerythritol, mannitol, sorbitol, arabitol, xylitol and the like. Mixtures of two or more of these may be used. A preferred embodiment, because of its ready availability, is a mixture containing four parts of mannitol and one part each of sorbitol and sucrose distearate (containing 30% of sucrose dipalmitate).

The amount of solid aliphatic polyhydroxy compound which is to be used will be within the range of from about 0.1% to about 2.0%. Generally, the relative proportions of the dialkyl pentaerythritol diphosphite and solid aliphatic polyhydroxy compound are such that the ratio of the one (phosphite) to the other (polyhydroxy compound) is from about 2:1 to about 1:2.

The vinyl chloride polymers herein may also contain a variety of other types of additives, including metal soaps of fatty acids such as calcium, barium, cadmium, zinc, magnesium and tin stearates; in most instances, mixed metal stearates are used. Other additives include epoxides such as epoxidized soya oil, epoxidized mono- and polyesters and ethers and lauryl glycidyl ether; 2-phenylindole, diphenylthiourea and benzoguanamine; phenolic antioxidants such as 2,6-ditertiarybutyl-p-cresol, p-nonylphenol and 2,2-methylene bis-(4-methyl-6-tertiarybutylphenol); sulfur antioxidants such as dilauryl thiodipropionate, thiolauric anhydride and thiodiethanol; ultraviolet stabilizers such as 2-hydroxy-4-methoxybenzophenone, 2-hydroxy-4-octoxybenzophenone and 2-(2'-hydroxy-5'-methylphenyl)benzotriazole; and lubricants such as glyceryl monostearate, polyesters waxes, ethylene bis-stearamide, paraffin and low molecular weight polyethylene.

The vinyl chloride polymer compositions herein are, as indicated, characterized by good color stability. They resist the ravages of prolonged high temperatures, even under simultaneous conditions of stress, e.g., by milling or shear. Also, there is relatively little coloration upon exposure to ultraviolet radiation.

The efficacy of the combination of this invention is shown by the data set out in Table I below. It shows the relative stability of a vinyl chloride polymer composition containing 0.5 part of Polyol* and 0.4 part of distearyl pentaerythritol diphosphite, with respect to the deterioration of color upon exposure to ultraviolet light. In addition to these ingredients, the test sample contains the following:

| Parts | Ingredients |
|---|---|
| 100 | Polyvinyl chloride (K value: 58) |
| 0.035 | Calcium stearate |
| 0.165 | Zinc octoate (12%) |
| 0.5 | Acrylic processing aid |
| 3.0 | Epoxidized soya oil |
| 0.45 | Wax ester |
| 1.5 | Lubricant |
| 0.1 | Polyethylene (M.P., 126° C.) |
| 10.0 | MBS (graft copolymer) |

*A mixture of for parts of mannitol, and one part each of sorbitol and sucrose distearate (containing 30% of sucrose dipalmitate).

The above test composition is used to prepare bottles by means of blow molding and sections of the bottle cut away to form the test samples. These test samples (B) are exposed to ultraviolet radiation at room temperature for varying periods of time and the degree of coloration noted for each sample. Similarly prepared test samples (A), differing only in that they contain no distearyl pentaerythritol diphosphite, are prepared and also exposed to ultraviolet radiation, and the coloration noted.

TABLE I

| Hours | Test Sample B | Test Sample A |
|---|---|---|
| 0 | clear | clear |
| 20 | clear | light brown |
| 50 | clear | brown |
| 70 | clear | brown |
| 100 | clear | dark brown |
| 200 | clear | dark brown |

It will be noted that Test Sample B, i.e., illustrative of the invention herein, is much more stable to discoloration than Test Sample A which is illustrative of the prior art teaching. Test Sample B is relatively unaffected by the ultraviolet radiation for 200 hours whereas the prior art sample has developed a dark brown color.

Another indication of the utility of the combination of the invention is shown by data obtained from a Heat Stability Test wherein test samples are milled on a two-roll mill at 190° C. (21/21 rpm) for three minutes and then placed in an oven in which the air is circulated at 200° C. The Yellowness Index (ASTM D1925-70) is noted at several intervals and the time (in minutes) required to reduce the sample to a charred state. The Yellowness Index (ASTM D1925-70) of each test sample, after varying periods of exposure, is also noted. The results are shown in Table II. Each of the test samples had the following composition:

| Parts | Ingredients |
|---|---|
| 100 | Polyvinyl chloride (K value: 58) |
| 0.03 | Calcium stearate |
| 0.18 | Zinc octoate (12%) |
| 0.5 | Acrylic processing aid |
| 3.0 | Epoxidized soya oil |
| 1.5 | Lubricant |
| 0.15 | Polyethylene (M.P., 126° C.) |
| 10.0 | MBS (graft copolymer) | plus additional ingredients as indicated in the Table. The above composition (A in Table II) is prepared by blending in a high-speed Papenmeier ® mixer until the temperature reaches 110° C. Test Samples B through J are prepared by blending the indicated additional ingredients with this composition in a small laboratory mixer.

TABLE II

| | Additional Ingredients | Time (min.) to Char | Yellowness Index | | | | | |
|---|---|---|---|---|---|---|---|---|
| | | | 0 min. | 2 min. | 9 min. | 12 min. | 16 min. | 20 min. |
| A. | None | 15 | 3.2 | 8.9 | 15.1 | 31.1 | >100 | — |
| B. | 0.4 Phosphite* | 23 | 2.9 | 7.6 | 10.5 | 19.8 | 32.1 | 47.8 |
| C. | 0.5 POlyol$^x$ | 18 | 3.1 | 8.0 | 10.7 | 16.7 | 70.4 | >100 |
| D. | 0.4 Phosphite* above Polyol$^x$ | 28 | 2.8 | 7.2 | 8.2 | 9.1 | 19.8 | 26.9 |
| E. | 0.5 Sorbitol | 23 | 3.1 | 14.5 | 38.2 | 59.3 | 80.8 | 90.9 |
| F. | 0.4 Phosphite* 0.5 Sorbitol | 30 | 2.7 | 7.9 | 10.8 | 18.4 | 23.6 | 24.6 |
| G. | 0.5 Mannitol | 25 | 6.3 | 13.9 | 24.7 | 36.7 | 79.8 | 85.4 |
| H. | 0.4 Phosphite* 0.5 Mannitol | 29 | 2.9 | 9.9 | 14.1 | 24.7 | 68.4 | 70.0 |
| I. | 0.5 Sucrose Distearate | 18 | 5.4 | 10.3 | 16.0 | 21.2 | 29.9 | >100 |
| J. | 0.4 Phosphite* 0.5 Sucrose Distearate | 23 | 2.9 | 8.1 | 11.3 | 12.5 | 20.4 | 50.6 |
| K. | 0.3 α-Phenyl Indole 1.0 TNPP$^y$ | 20 | 2.9 | 7.7 | 10.1 | 10.2 | 35.0 | >100 |

Test Sample K above is typical of prior art combinations currently used in the trade

*Distearyl pentaerythritol diphosphite
$^x$1,1,1-tris-(hydroxymethyl)ethane
$^y$Tris-(nonylphenyl)phosphite The above test samples (Table II), when subjected to Dynamic Mill Stability Test, again show the unique effectiveness of the compositions of the invention. This test requires the test sample to be milled on a two-roll mill (21/21 rpm) at 190° C. and the Yellowness Index noted at six- and nine-minute intervals. See Table III.

TABLE III

| | Yellowness Index | | |
|---|---|---|---|
| | 0 min. | 3 min. | 9 min. |
| A. | 3.2 | 30.4 | 37.8 |
| B. | 2.9 | 18.6 | 21.0 |
| C. | 3.1 | 24.2 | 28.1 |
| D. | 2.8 | 4.3 | 15.9 |
| E. | 3.1 | 31.6 | 40.2 |
| F. | 2.7 | 12.2 | 16.2 |
| G. | 6.3 | 29.8 | 38.9 |
| H. | 2.9 | 13.8 | 17.1 |
| I. | 5.4 | 28.6 | 36.8 |
| J. | 2.9 | 17.9 | 20.8 |
| K. | 2.9 | 4.2 | 13.9 |

It will be noted that Test Samples, D. F, H and J (which are illustrative of the invention) are clearly superior to B and C, B and E, B and G, and B and I (which contain the individual additives).

Still further, evidence of the superior characteristics of the additive combination of the invention may be seen in the results of a Brabender Melt Rheology Test. The test samples (A through K, 30 grams each) of Tables II and III are stirred at 60 rpm and 200° C. until the onset of degradation. The time requires to produce such degradation is recorded as a measure of the stability of the sample.

TABLE IV

| | Onset of Degradation (min.) |
|---|---|
| A. | 8 |
| B. | 16 |
| C. | 10.5 |
| D. | 19 |
| E. | 16.5 |
| F. | 20 |
| G. | 17 |
| H. | 18 |
| I. | 12 |
| J. | 15.5 |
| K. | 14 |

Again, it will be seen that Test Samples D, F, H and J exhibit stabilities superior to those of B and C, B and E, B and G, and I.

All parts and percentages here, unless otherwise expressly indicated, are by weight.

We claim:

1. A composition of matter effective in minor proportions to impart color stability to vinyl chloride polymers comprising in combination a dialkyl pentaerythritol disphosphite wherein the alkyl groups each contain 8–20 carbon atoms and a solid aliphatic polyhydroxy compound, the ratio of dialkyl pentaerythritol disphosite to polyhydroxy compound being from about 2:1 to about 1:2.

2. The composition of claim 1 wherein the dialkyl pentaerythritol diphosphite is distearyl pentaerythritol diphosphite.

3. The composition of claim 1 wherein the distearyl pentaerythritol diphosphite is encapsulated in a wax.

4. The composition of claim 3 wherein the wax is a montanic acid ester.

5. The composition of claim 1 wherein the solid aliphatic polyhydroxy compound contains six hydroxy groups.

6. The composition of claim 1 wherein the solid aliphatic polyhydroxy compound is sorbitol.

7. A relatively heat-stable polymer composition comprising a vinyl chloride polymer and minor proportions, sufficient to provide such stability, of each of a dialkyl pentaerythritol diphosphite wherein the alkyl groups each contain 8–20 carbon atoms and a solid aliphatic polyhydroxy compound.

8. The polymer composition of claim 7 wherein the vinyl chloride polymer is a copolymer comprising at least about 80% of vinyl chloride units.

9. The polymer composition of claim 8 wherein the vinyl chloride polymer is polyvinyl chloride.

10. The polymer composition of claim 7 wherein the dialkyl pentaerythritol diphosphite is distearyl pentaerythritol diphosphite.

11. The polymer composition of claim 7 wherein the dialkyl pentaerythritol diphosphite is substantially pure spiro isomer.

12. The polymer composition of claim 7 wherein the dialkyl pentaerythritol diphosphite is encapsulated in a wax.

13. The polymer composition of claim 7 wherein the wax is a montanic acid ester.

14. The polymer composition of claim 7 wherein the solid aliphatic polyhydroxy compound contains six hydroxy groups.

15. The composition of claim 14 wherein the solid aliphatic polyhydroxy compound is a mixture of such compounds containing four parts of mannitol and one part each of sorbitol and sucrose distearate (containing 30% of sucrose dipalmitate).

16. The polymer composition of claim 7 wherein the solid aliphatic polyhydroxy compound is sorbitol.

17. The polymer composition of claim 7 wherein the solid aliphatic polyhydroxy compound is a mixture of such compounds containing four parts of mannitol and one part each of sorbitol and sucrose distearate (containing 30% of sucrose dipalmitate.

* * * * *